United States Patent [19]
Winser

[11] Patent Number: 5,544,292
[45] Date of Patent: Aug. 6, 1996

[54] DISPLAY APPARATUS HAVING A DISPLAY PROCESSOR FOR STORING AND FILTERING TWO DIMENSIONAL ARRAYS FORMING A PYRAMIDAL ARRAY, AND METHOD OF OPERATING SUCH AN APPARATUS

[75] Inventor: Paul A. Winser, Redhill, England

[73] Assignee: U.S. Philips Corporation, New York, N.Y.

[21] Appl. No.: 641,387

[22] Filed: Jan. 15, 1991

[30] Foreign Application Priority Data

Jan. 15, 1990 [GB] United Kingdom ............... 9000843

[51] Int. Cl.$^6$ ............................................. G06T 1/00
[52] U.S. Cl. ................................. 395/130; 395/164
[58] Field of Search .................................. 395/130, 132, 395/163, 164, 166

[56] References Cited

U.S. PATENT DOCUMENTS

| | | | |
|---|---|---|---|
| 4,400,768 | 8/1983 | Tomlinson | 364/200 |
| 4,615,013 | 9/1986 | Yan et al. | 395/130 |
| 4,797,942 | 1/1989 | Burt | 382/41 |
| 4,974,176 | 11/1990 | Buchner et al. | 364/522 |

OTHER PUBLICATIONS

"Pyramidal Parametrics", L. Williams, Computer Graphics, vol. 17, No. 3 (Proc. SIGGRAPH 1983), pp. 1–11.
"Survey of Texture Mapping", P. S. Heckbert, IEEE Computer Graphics and Applications, Nov. 1986, pp. 56–67.

Primary Examiner—Heather R. Herndon
Attorney, Agent, or Firm—Edward W. Goodman

[57] ABSTRACT

The display apparatus includes a host processor having associated main memory, and a display processor (28', 49 etc.) having an associated texture memory (41') for storing a pyramidal or part-pyramidal array of texture element ("texel") values. Each pyramidal array includes a plurality of two-dimensional (2-D) arrays representing a 2-D modulation pattern at at least two distinct levels of resolution. The display processor further includes a circuit (28') for generating 2-D coordinate pairs (U1, V1) addressing texel values in a stored 2-D array, and 2-D interpolators (BIL1, BIL2) responsive to fractional parts (U1f, V1f) of the 2-D coordinate pairs for combining together a number of texel values from the addressed array so as to generate an interpolated texel value (MOD1). The apparatus further includes feedback (70, 76 etc.) whereby interpolated texel values generated by the 2-D interpolators from one 2-D array can be stored back in the texture memory (41') to form a further 2-D array of the pyramidal or part-pyramidal array. This enables the high-speed generation of the successively pre-filtered arrays required to form a pyramidal array from a single externally-generated higher-resolution array.

19 Claims, 4 Drawing Sheets

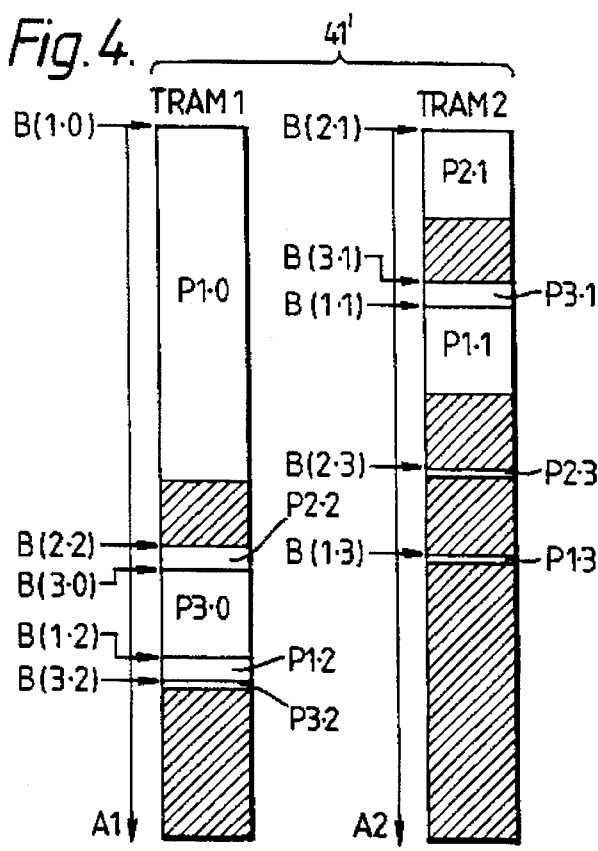
Fig. 4.
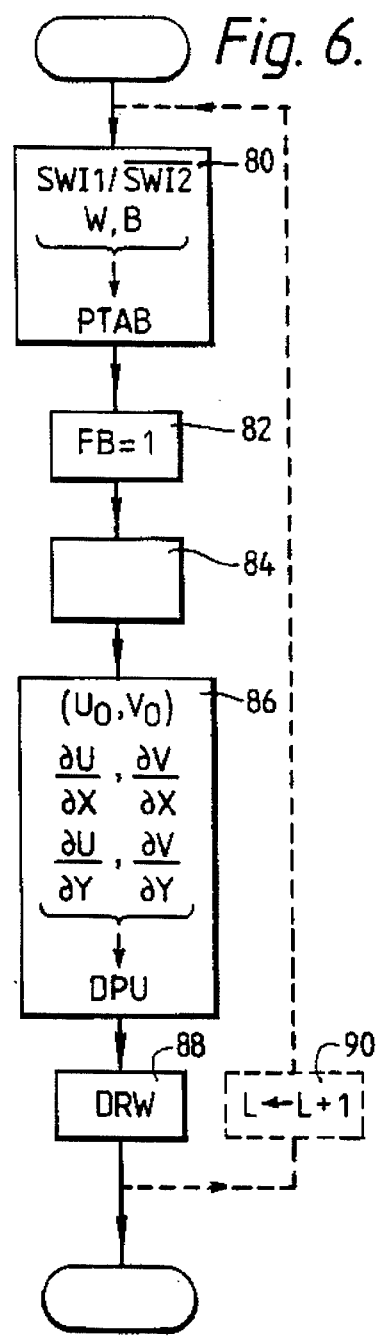
Fig. 6.
Fig. 5.

6,544,292

DISPLAY APPARATUS HAVING A DISPLAY PROCESSOR FOR STORING AND FILTERING TWO DIMENSIONAL ARRAYS FORMING A PYRAMIDAL ARRAY, AND METHOD OF OPERATING SUCH AN APPARATUS

CROSS-REFERENCE TO RELATED APPLICATIONS

This application is related to U.S. patent application Ser. Nos. 07/641,386 (now abandoned) and 07/641,228 (PHB 33,612 and PHB 33,611), both filed concurrently with this application.

FIELD OF THE INVENTION

The invention relates to a display apparatus including a display processor having associated texture memory for storing a pyramidal or part-pyramidal array of texture element ("texel") values comprising a plurality of two-dimensional (2-D) arrays represesenting a 2-D modulation pattern at at least two distinct levels of resolution, the display processor further comprising, for receiving a primitive description, this description including an indication that the stored modulation pattern is to be mapped onto a primitive for display, means for generating 2-D coordinate pairs addressing texel values in a stored 2-D array to effect the mapping of the stored modulation pattern onto the primitive, and 2-D interpolating means responsive to fractional parts of the said 2-D coordinate pairs for combining together a number of texel values from the addressed array so as to generate an interpolated texel value.

The invention further relates to a method of operating such a display apparatus.

DESCRIPTION OF THE RELATED ART

An apparatus of the type set forth in the opening paragraph is described in WO 85/00913 corresponding to U.S. Pat. No. 4,615,013 to Yan et al., and provides real-time synthesis and display of images representing three-dimensional scenes for flight simulation. The apparatus implements a technique known in the art as "texture mapping", in which a 2-D pattern (the "texture") is pre-generated and stored in the texture memory, whereupon a single primitive is then rendered (transformed from "object space" into screen space and scanned into the display memory) with the texture mapped onto it. The technique enables a large amount of surface detail to be represented without a corresponding increase in the number of primitives that have to be rendered to produce an image. In a simple case, the stored pattern defines the color of an object's surface, so that the texel values may constitute the color values which may be written directly into the display memory. In a more general case, the texel values may be subjected to or otherwise control further processing, for example to allow the rapid calculation of complex lighting effects.

Texture mapping can be implemented entirely in software, but in the context of the present invention, we are concerned with hardware implementations in the field of real-time image synthesis. To avoid aliasing effects, it is necessary to filter the texel values during mapping. To simplify the computation of filtered values, the known apparatus stores textures in so-called pyramidal arrays, comprising a succession of 2-D arrays, each pre-filtered to a different level of resolution. A simple 2-D interpolating means such as a bilinear interpolator is then sufficient, since each interpolated value is generated from a small and constant patch of texel values in the appropriate 2-D array. The generation and storage of pyramidal texture arrays are described by Lance Williams in a paper entitled "Pyramidal Parametrics" in Computer Graphics, Volume 17, No. 3 (Proc. SIGGRAPH 1983) at pages 1 to 11.

The generation of a pre-filtered pyramidal array is conventionally undertaken by software running on the host processor. The successive 2-D arrays of the pyramid in the host memory are generated from a large highest-level array received from a source, for example a video camera, to obtain the texture of a natural object, or may be generated by calculations of lighting etc., using data defining the 3-D object space being depicted. This software process of pre-filtering can be very slow because a large number of memory accesses are involved in generating each filtered value from a patch of higher-resolution texel values. Also, each texel value may comprise several independent components (R,G, B, for example) which must be interpolated separately in the conventional host processor.

This slowness means that texture pyramids cannot be generated only when required for real-time display: all levels of all texture pyramids that may be required must be generated before commencing real-time image synthesis. This can lead to a very large part of main memory space being occupied by texture arrays that are never used. It also rules out the use of textures that may vary depending on how the 3-D model develops. For example, it is known for texture maps to be used to define reflection patterns in a technique known as "environment mapping". If an object moves into the environment in the course of a simulation, the environment map should ideally change accordingly.

It would therefore be advantageous to be able to generate pyramidal or part-pyramidal arrays from single 2-D arrays more quickly than at present, but the cost of providing 2-D filtering hardware dedicated to this purpose would, in many cases, be prohibitive.

SUMMARY OF THE INVENTION

The invention provides a display apparatus as set forth in the opening paragraph characterized in that the apparatus further comprises feedback means whereby interpolated texel values generated by the 2-D interpolating means from one 2-D array can be stored back in the texture memory to form a further 2-D array of the pyramidal or part-pyramidal array.

The invention also provides a method of operating a display apparatus constructed in accordance with the invention as set forth in the preceding paragraph, the method comprising the steps of:

(a) transferring from the main memory to the texture memory a first 2-D array of texture values representing a 2-D modulation pattern at a first level of resolution;

(b) causing the means within the display processor to generate 2-D coordinate pairs addressing, systematically, the texel values in the first 2-D array so that the interpolated values generated by the interpolating means are fewer in number than those in the first 2-D array and represent the modulation pattern at a second level of resolution lower than the first level; and (c) activating the feedback means so as to store the interpolated values in the texture memory in the form of a second, smaller 2-D array of texel values, which thereby forms, with the first 2-D array, part of a pyramidal array. The second 2-D array, when stored, may for example contain half as many texel values as the first array in one or both dimensions.

The invention makes use of the recognition that if the means within the display processor are caused to scan the stored 2-D array systematically but at a low density by generating appropriately spaced 2-D coordinate pairs, then the series of values generated by the interpolator, which would conventionally be used to define pixel values in the display memory, can be made to have the same values that are required to form a 2-D array representing the same pattern at a lower-resolution. The steps (b) and (c) of the method can be repeated or not to generate as many or as few levels of the pyramid as are required.

The invention saves memory space in the main memory, which need then only store the highest level of a given pyramid (and perhaps one other medium-level array in case only low resolution is called for). Also, the speed of generation of the pyramid will generally be much faster when performed by the display processor hardware than when performed by the host processor. For example, special addressing hardware will be provided in the display processor, and the interpolation means will often contain three parallel interpolators, one each for red, green and blue component values, whereas the host processor processes these components serially.

The texture memory may comprise separate first and second parallel-addressable texture memory banks while the feedback means are arranged to store the further 2-D array in a different one of the said texture memory banks to that in which the one 2-D array is stored, thereby enabling the read-out of texel values from the one 2-D array for supply to the interpolation means to be performed in parallel with the storage of interpolated values to form the further 2-D array. This provides a further speed advantage over the host processor since the main memory is not conventionally dual-ported.

In one such embodiment where there are only the first and second texture memory banks, the 2-D coordinate generating means and the feedback means are arranged to generate and store successively lower-resolution levels of the pyramidal array alternately in the first and second texture memory banks.

The texture memory may be divided (or further divided) into at least three parallel-addressed memories, while the 2-D array storage means are arranged to distribute the texel values of each 2-D array in an interleaved manner so that values for a 2-D patch of texels may be read in parallel from the texture memory (or from each of the first and second texture memory banks, where provided), the interpolation means being arranged to combine 2-D interpolation within each patch with inter-level interpolation to generate a single 3-D interpolated value from two patches comprising six or more stored texel values. This allows very rapid readout of texel values for display, requiring no more memory read cycles than would be required to perform simple point sampling.

The 2-D patch addressing can also be used to speed up the generation of pyramidal arrays in accordance with the invention, however. Accordingly, the interpolation means may include first and second 2-D interpolators, for performing 2-D interpolation between the values within 2-D patches stored in first and second texture memory banks respectively, while the feedback means provides means whereby texel values read from a 2-D array stored in one texture memory bank and interpolated by the first 2-D interpolator may be written into a further 2-D array in another texture memory bank.

The texture memory may comprise a linearly-addressed memory, the display processor further comprising physical address generating means for receiving a 2-D coordinate pair and for generating therefrom a linear physical address for application to the texture memory. In accordance with another invention disclosed herein, the use of a linear texture address space allows more efficient use of the available texture memory.

BRIEF DESCRIPTION OF THE DRAWINGS

Embodiments of the invention will now be described, by way of example, with reference to the accompanying drawings in which:

FIG. 4 illustrates the storage of three pyramidal texture maps in two linear texture memories in the hardware of FIG. 3;

FIG. 5 illustrates the contents of a page table memory in the hardware of FIG. 3;

FIG. 6 is a flowchart illustrating the generation of filtered 2-D arrays using feedback paths in the hardware of FIGS. 3 to 5, in accordance with the present invention.

DETAILED DESCRIPTION OF PREFERRED EMBODIMENTS OF THE INVENTION

Figure 1:
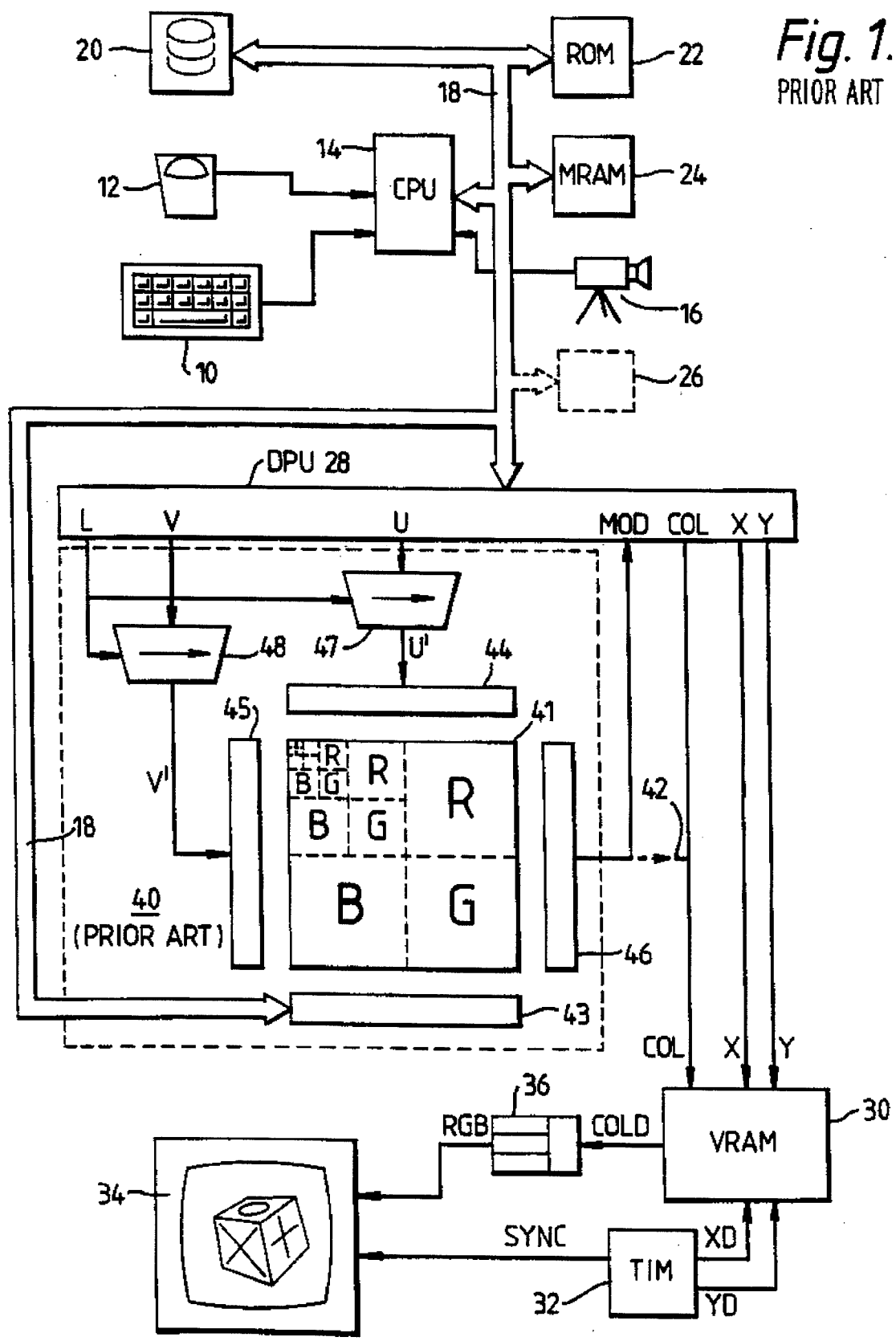
FIG. 1 is a block diagram of a display apparatus including a known type of texture mapping hardware.

FIG. 1 is a block diagram of a display apparatus including a known type of texture mapping hardware. A keyboard 10 and a tracker ball-type input device 12 provide input from a user to a central processing unit (CPU) 14. The tracker ball may be used for designing 3-D objects to be manipulated by the system, in a known manner. Other input devices may also be used, of course, such as a joystick, digitizing tablet, or a "mouse". Such devices may also be used to manipulate images created by rotating, zooming etc. In general, such devices can be used more intuitively and efficiently than a conventional keyboard alone. Objects and also photographic images to be applied to object surfaces by texture mapping can also be input from a video source such as a camera 16.

The CPU 14 is connected via a bus 18 (for example a VME bus) to a disc store 20, a ROM 22 and a main memory (MRAM) 24. The disc store, which may include magnetic floppy discs, hard discs, and/or optical memory discs, is used for storing data (for example images or 3-D model data) which can then be recalled and manipulated to generate new images as desired. Such data may include the user's work from previous input sessions, and/or commercially generated data, for example for use in interactive computer-aided design or computer simulations for education or entertainment. To allow modelling of 3-D objects, such data will generally be stored as polygonal model data rather than in the form of two-dimensional images. In that case, the data corresponds to a 3-D model containing objects which are typically broken down into groups of polygonal surfaces (primitives) in a 3-D "object" space (triangular or quadrilateral surfaces for example). The data for each object in the model comprises a list giving the position and nature of every polygon that goes to make up the object, including the relative positions of its vertices and the color or transparency of the polygon surface. In other systems, primitives may comprise curved surface patches, as is known in the art. It is known that a "texture" can be specified for mapping onto the surface, so that detail can be represented without increasing the number of primitives that make up the scene. A texture map is a stored 2-D array of texture element ("texel") values defining a 2-D pattern of modulation that may for example define the color of pixels in a manner to described below. The texture may alternatively modulate other quantities such as reflectance or surface normal direction, as is known in the art. These texture maps may also be stored in the disc store 20 and recalled as required.

The CPU 14 and the other components of the system then translate the 3-D model "world" in object space into a two-dimensional view for the user (in "viewer" space), from whatever viewpoint the user chooses, by means of geometric transformations effecting translations, rotations and perspective projections, generally by means matrix multiplication of vertex coordinates. The CPU 14 may also perform clipping and lighting calculations on a per-primitive or per-vertex basis.

The ROM 22 and MRAM 24 provide program memory and workspace for the CPU 14, which may comprise a microprocessor, such as a Motorola MC68020. Special processing hardware 26 may be provided to assist the CPU 14 to perform the large number of arithmetic operations required to convert all but the simplest models into a two-dimensional scene. The hardware 26 may comprise standard arithmetic circuits or it may include more powerful custom-built or programmable digital signal processing (DSP) integrated circuits, and may be connected to the CPU 14 for example via a VME bus connection. The nature of the hardware 26 will depend on the requirements of the system, for example with respect to speed, resolution, number of primitives per scene, etc.

A display processing unit (DPU) 28 is connected between outputs of the CPU 14 (the bus 18) and inputs of a display memory (VRAM) 30. The display memory 30 stores pixel data COL in raster-scan format. The pixel data COL might typically include for each pixel three 8-bit values (total 24 bits) corresponding to red (R) green (G) and blue (B) components of the desired image. Those skilled in the art will appreciate that in other embodiments fewer or more bits may be provided for, or the bits might define the color in terms of different components.

In the DPU 28, the primitives are "scan converted" so that they may be drawn into the display memory 30. Scan conversion is a process whereby the pixels covered by each primitive are written row by row and pixel by pixel, in the same way that the complete image will be scanned for output to the display.

A timing unit (video controller) 32 generates read-address signals XD and YD to address the pixel data within the VRAM 30 synchronously with the raster-scanning of a display screen 34. In response to these address signals, the locations in the VRAM 30 are scanned row-by row and column by column to read color values COLD which are fed to a digital to analogue converter (DAC) 36. If a non-RGB color code is used, a matrix circuit or color look-up table may be provided to translate the pixel data COLD into the equivalent RGB signal for supply to the display screen 34, which may for example be a cathode-ray tube (CRT) display screen. The display 34, directly or indirectly, also receives timing signals (SYNC) from the timing unit 32.

To draw or "render" a primitive, the CPU 14 (or the special hardware 26) causes registers within the DPU 28 to be loaded, via the bus 18, with values defining a single primitive (for example in terms of vertex coordinates, edge slope and so on) and its various attributes—color, reflectance and so forth. The DPU 28 then generates pixel coordinates (X and Y) so as to scan systematically the entire area covered by the primitive. The pixel coordinates X and Y are applied as write addresses to the VRAM 30, so that a pixel value COL can be written into the VRAM 30 for every pixel.

The pixel values COL can be generated so that a basic surface color of the primitive is modulated to account realistically for attributes of an object's surface (for example color, transparency, diffuse reflectance, specular reflectance) and of the 3-D environment (for example locations, colors and shapes of light sources, distance haze). This modulation can be generated arithmetically from parameters loaded with the primitive data, for example to produce smoothly varying shading to simulate a curved surface. However, to provide more detailed modulation, it is known to use mapping hardware such as that referenced 40 to supply modulation values MOD according to a predetermined pattern stored in advance in a texture memory 41.

Figure 2:
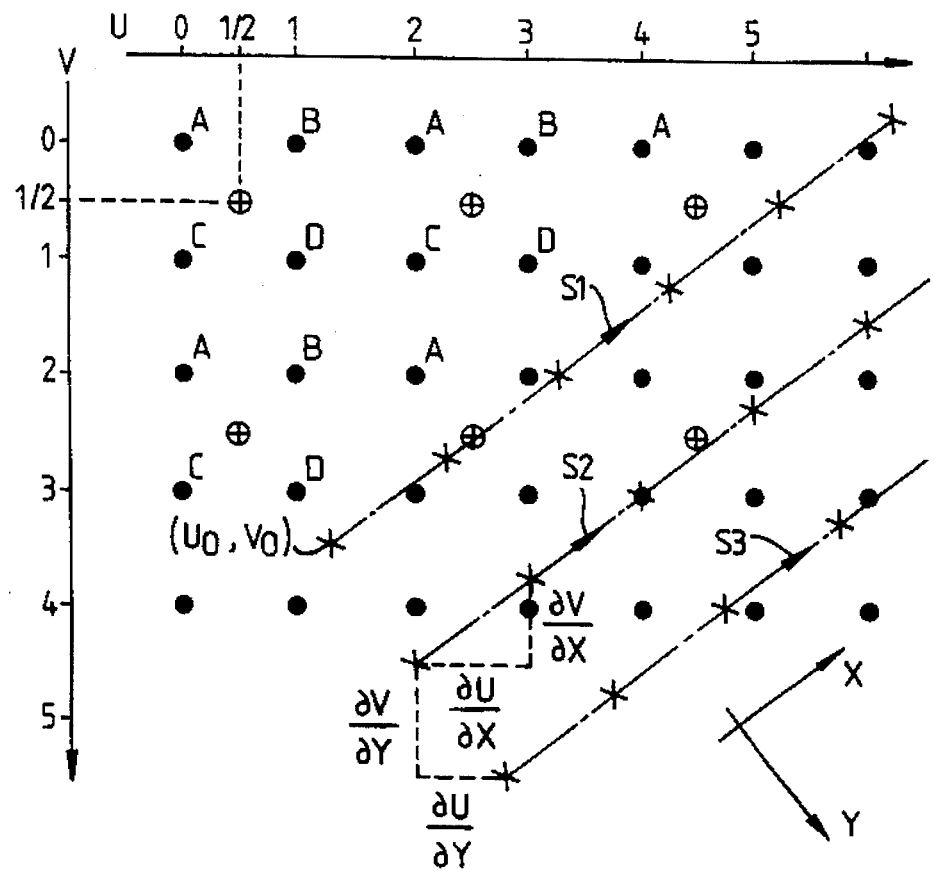
FIG. 2 shows a 2-D array of texel values stored in a texture memory.

To this end, the DPU 28 generates a pair of texture coordinates U and V simultaneously with each pair of pixel (display) coordinates X and Y so that the modulation pattern is mapped onto the primitive surface, implementing geometric transformations (i) from texture space into object space and (ii) from object space into viewer (display) space. FIG. 2 provides an illustration of the relationship between texture space, defined by the horizontal and vertical axes labelled U and V, and screen space defined by the oblique axes X and Y. The actual stored texel values correspond to integer values of U and V and are represented by a square array of solid circular dots. The locations of the pixels in screen space are marked by diagonal crosses ('x') and lie along scanlines referenced S1, S2 and S3 etc. parallel to the X-axis.

To define the coordinates U and V required to address texel values corresponding to the series of pixel values on the scanlines S1, S2, S3 etc., the CPU 14 (or drawing hardware 26) may for example provide the DPU 28 in advance with the coordinate pair $(U_0, V_0)$ corresponding to the first pixel on scanline S1, and also partial derivatives $\partial U/\partial X$ and $\partial V/\partial X$ defining the slope of the screen space scanlines S1 etc. in texture space and partial derivatives $\partial U/\partial Y$ and $\partial V/\partial Y$ defining the slope of the pixel columns in texture space. In the example illustrated, the transformation from texture space to screen space is linear. In a more general case, the scanlines S1 etc. and the pixel columns might diverge or converge, or even curve, in which case the partial derivatives vary from point to point across the primitive.

The texture coordinates U and V are processed within the mapping hardware 40 in a manner to be described below and applied to the texture memory 41 so that a modulation value MOD is available for each pixel location X,Y being addressed. The value MOD commonly comprises a color value, and in principle it could directly form the pixel value COL and be fed directly into the display memory (VRAM) 30, as shown by the dotted data path 42. More commonly, however, even if the values MOD are color values, they will require to be modified within the DPU 28 to allow for realistic lighting effects. In a more general case, the modulation values MOD are used within the DPU 28 together with other parameters to modify the pixel values COL less directly. For example, in so-called "bump mapping", the values MOD modulate the surface normal direction of the primitive, so as to affect subsequent lighting calculations and so, indirectly, the pixel values COL. Another technique, known as "environment mapping", uses the TRAM to store an image of the environment, for example using U and V as spherical coordinates, so that specular reflections of a complex environment (including light sources, windows, other objects and so on) can be simulated. These and various other applications of mapping hardware are summarised in an article "Survey of Texture Mapping" by Paul S. Heckbert in IEEE Computer Graphics and Applications, November 1986 at pages 56 to 67. Those skilled in the art will recognize that the invention may be applied in all such applications of mapping hardware.

It is known that the texels represented in the texture memory 41 will not in general correspond on a one-to-one basis with the pixels of the display and, in particular when the primitive is shown in the distance and the texture is consequently mapped onto a very small number of pixels, two-dimensional spatial filtering is required to avoid the aliasing effects that would be disturbing to the viewer if simple sub-sampling were used.

It is further known that a generalized filter cannot be applied economically in an apparatus where real-time moving images are to be synthesized, and the Williams reference describes the conventional solution to this which is to store several 2-D arrays (hereinafter referred to as "maps") for a given pattern, each being successively smaller and pre-filtered to a successively lower resolution. The DPU 28 then need only produce a level coordinate L to determine the appropriate map to use. For compact storage and fox high speed access to the texel values, the maps may be chosen to be square, having power-of-two dimensions, and be stored in a square texture memory according to the "multum in parvo" ("MIP map") technique described by Williams.

FIG. 1 shows, within the texture memory 41, the color components R, G and B of a texture pyramid stored as a MIP map. The largest (highest resolution)map (L=0) may for example comprise 512×512 texels, the L=1 maps comprise 256×256 texels and so on down to L=9 where each map becomes a single texel. Assuming, for the sake of example, that each texel value comprises an 8-bit value for each of the R, G and B color components, the entire texture memory 41 is thus 1 Mbyte in size.

The texel values are stored in the memory 41 in advance of rendering by the CPU 14 via the bus 18 and a writing port 43 of the memory 41. For each texel value to be read, the DPU 28 generates a 2-D coordinate pair, each coordinate (U and V) of which includes at least an integer part 9 bits in length. At the same time, the level coordinate L is generated by the DPU 28 and used to generate physical coordinates U' and V' from the "virtual" coordinates U and V for application to read address ports 44 and 45, respectively, of the texture memory 41. In response to each physical coordinate pair U', V', the memory 41 releases the R, G and B components of an addressed texel via a (24-bit) read port 46.

Because of the two-dimensional binary tree arrangement of the MIP maps in the memory 41, the required physical coordinates U' and V' can be generated simply by a pair of binary shifting circuits 47 and 48, respectively, each right-shifting the respective coordinate a number of places defined by the level coordinate L. In particular, if L=0 represents the highest level, then the address corresponding to a given texel in the level 0 map can be converted to the physical address of the corresponding texel in the level L map can be found by right-shifting the U and V coordinates L places, effectively scaling-down each coordinate by $2^L$. The level coordinate L can be supplied to the DPU 28 as part of the primitive data, but if perspective is to be accounted for in the mapping, then the level coordinate L will more probably be generated within the DPU on a per-pixel basis, dependent on the partial derivatives of U,V with respect to X,Y.

In order to allow full anti-aliasing, it is known to apply 3-D (for example, trilinear) interpolation between texel values, in which case the coordinates L, U' and V' can have fractional parts (Lf, Uf' and Vf') as well as integer parts (Li, Ui', Vi'). The fractional parts of the U' and V' coordinates can be used to perform 2-D (for example, bilinear) interpolation between a square patch of four adjacent texels within one level, and the fractional part Lf of the level coordinate can be used to interpolate between (2-D interpolated) texel values from two adjacent levels of the pyramidal array. To this end, it is necessary to read four texel values (Ui',Vi'), (Ui'+1, Vi'), (Ui',Vi'+1) and (Ui'+1,Vi'+1) from the level Li map and four from the level Li+1 map. Clearly a speed penalty is involved if these eight texel values are read serially. Fortunately, the four texel values for each level can be read in parallel via the read port 46 if the texture memory is constructed as four parallel memories interleaved to allow 2×2 patch addressing, as described hereinafter, enabling the eight values to be read in only two memory read cycles. It would be .desirable, however, to enable both sets of four (Li and Li+1) texel values to be read in parallel and the Williams reference suggests that a hard-wired addressing scheme could enable parallel access to all levels of a given MIP map. While this is possible in theory, the number of connections involved in the scheme proposed by Williams is too great to make it an economic solution for mass market applications. For example, with ten levels, 2×2 patch addressing (except at the lowest level) and 8 bits each for R, G and B per texel, 888 bits of data would need to emerge from the read port 46 of the texture memory 41 for every coordinate pair U,V applied.

In general, it will be desirable to store different texture pyramids in the texture memory 41. For example three texture pyramids might define the shapes 'o', '+' and 'x' mapped onto the faces of the cube shown on the screen of the display 34 in FIG. 1. For this purpose, it is known to divide the square array at each level of the MIP map and store a mosaic of the corresponding 2-D arrays defining each 2-D pattern. The coordinate pairs U,V generated by the DPU 28 would then incorporate 2-D offsets to ensure that the correct part of the 2-D array is addressed. In this known technique, however, some of the space in the texture inevitably remains unused, effectively wasted. It is not possible in a general case, to eliminate unused space from a mosaic of 2-D shapes. For example, arranging the three square arrays representing the texture problems 'o', '+' and 'x' into the square array at each level in the texture memory 41 of the known hardware would result in at least one quarter of the available memory being wasted. Finding even an optimum solution to a general 2-D "jigsaw puzzle" is difficult, and would be quite impractical in real-time if arrays were allowed to take different shapes, such as squares, rectangles, triangles.

It is a further disadvantage of the MIP map approach that each texture pyramid occupies space at all levels (1 Mbyte in the example given above), even though, in a scene where the primitive is seen only in the distance, only one or two of the smaller maps (L=5, L=6 etc) may actually be being used at the time. It would be very advantageous if only the levels likely to be needed were stored in the texture memory at any one time and the freed space could be used for other texture maps. For example, even though the largest map (L=0) of the pyramid may never actually be read in the course of rendering an image, it still occupies three-quarters of the total texture memory storage. Unfortunately, it would be very difficult to provide the known hardware with the flexibility to overcome either of the above disadvantages.

Figure 3:
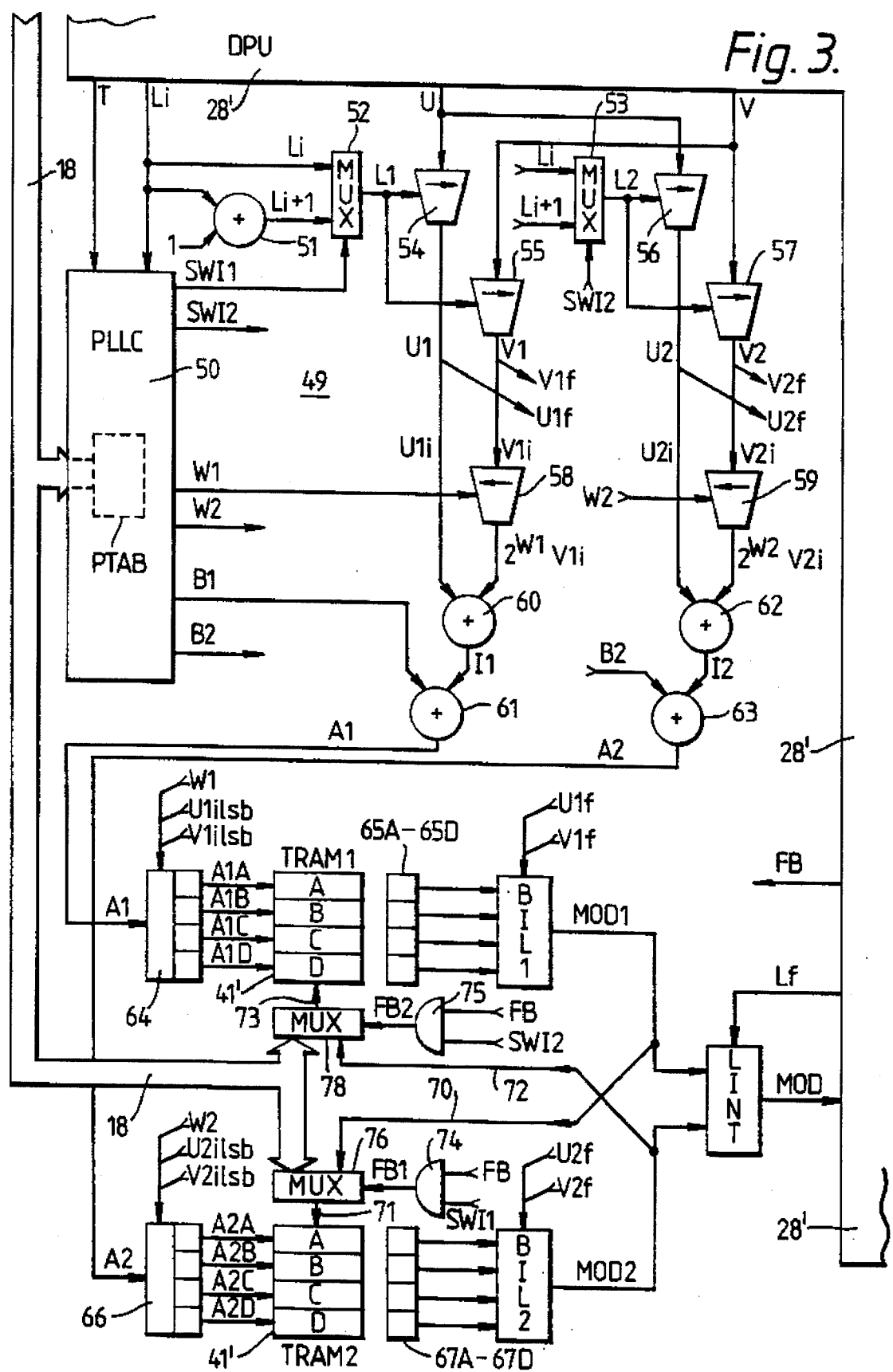
FIG. 3 is a block schematic diagram of novel texture mapping hardware embodying the present invention.

FIG. 3 shows novel mapping hardware that can be substituted for that shown at 40 in FIG. 1. A linearly-addressed texture memory 41' is provided, so that the problem of eliminating wasted space is readily solvable. A texture management circuit 49 keeps track of the various arrays within the linear memory 41' and serves to convert the pyramidal coordinates L, U and V into linear physical texel addresses. Instead of using a 2-D offset to identify different textures all stored as a mosaic within a large map, the CPU 14 in the novel system supplies, with the primitive data, a texture identifying value T separate from the coordinates U and V. Any 2-D map forming part of a texture pyramid can thus be identified as map T.Li, where Li is the integer part of the level coordinate L. The circuit 49 is more complex than the simple 2-D MIP addressing hardware, but the improvement in memory utilization and flexibility may be very great.

The DPU 28' in FIG. 3 is a slightly modified version of the conventional DPU 28 (FIG. 1), having an output T for passing the received identifying value to the texture management circuit 49. The modified DPU 28' also has an output carrying a logic signal FB for activating feedback paths as described in a later part of this description.

The novel hardware shown in FIG. 3 incorporates not only 2×2 patch addressing (to allow high-speed bilinear interpolation), but also a novel parallel structure so that eight texel values are available for trilinear interpolation simultaneously, yet without the excessive parallelism of the solution proposed by Williams. For this purpose, the texture memory 41' is divided into two banks of memory, TRAM1 and TRAM2, and the system ensures that arrays T.Li and T.Li+1 for two adjacent levels of a given texture pyramid will always be stored in different banks TRAM1 and TRAM2.

The texture management circuit 49 has inputs to receive the signals T, L, U and V from the DPU 28'. The texture management circuit includes a page location and logic circuit (PLLC) 50 which receives the texture identification T and at least the integer part Li of the level coordinate L supplied by the DPU.

The PLLC 50 stores information defining for each map T.Li (i) in which bank TRAM1 or TRAM2 the map T.Li is stored, (ii) the width w(T.Li) of the map in the U-direction and (iii) a base address B(T.Li) locating the start of the linearly-stored array in the appropriate bank TRAM1 or TRAM2.

In general terms, the PLLC 50 supplies the stored data for the maps T.Li and T.Li+1 to the remainder of the circuit 49 which is thereby enabled to generate linear addresses A1 and A2 for application to the memory banks TRAM1 and TRAM2, respectively, so as to address the texel data for coordinate pair (U,V) in the levels Li and Li+1 in the texture pyramid T. The general formulae for these linear addresses are:

$$A(T \cdot Li) = \frac{U}{su(T \cdot Li)} + w(T \cdot Li)\frac{V}{sv(T \cdot Li)} + B(T \cdot Li)$$

and $$A(T \cdot Li+1) = \frac{U}{su(T \cdot Li+1)} +$$

$$w(T \cdot Li+1)\frac{V}{sv(T \cdot Li+1)} + B(T \cdot Li+1)$$

with address A1=A(T.Li) or A(T.Li+1), depending on which of the two maps T.Li and T.Li+1, respectively, is stored in memory bank TRAM1, and address A2=A(T.Li+1) or A(T.Li), correspondingly. In the above expressions, su(T.Li) and sv(T.Li) represent generalized scale factors relating the dimensions of the map T.Li to those of the largest map (T.0) in the pyramid T, in the U- and V-directions respectively.

As in the known system, the addressing hardware in accordance with the invention can be greatly simplified if the scaling factors su(T.Li) and sv(T.Li) are limited to powers of two, defined, for example, by the expression $su=sv=2^{Li}$ for all values of L and T. Further simplification of the hardware can be obtained, as in the MIP map system, by limiting the width values w of maps to be powers of two texels, defined, for example, by a width index W(T.Li) and the expression $w(T.Li)=2^{W(T.Li)}$. Both of these simplifying features are incorporated in the texture management circuit 49 shown in FIG. 3. These restrictions allow not only squared but also rectangular maps, but a hardware implementation of the more general formulae given above could be constructed if desired. The general formulae could also be further generalized to allow efficient storage of other shapes, for example triangular or trapezoidal textures, by causing the width w in the U-direction to vary across the map in the V-direction in a linear or even non-linear manner.

Taking into account these limitations introduced to simplify the hardware, new formulae can be derived for translation into simplified hardware. These formulae are given below and use the symbols "→" and "←" to indicate a binary right shift (divide) and left shift (multiply), respectively. Thus, for example, the expression "(U→L1)i" indicates the integer part of a value U after right-shifting by L1 bit positions, in other words the quotient of U and $2^{L1}$.

A1=(U→L1)i+((V→L1)i ←W1)+B1 where L1=Li or Li+1 and $w(T\ L1)=2^{W1}$, and

A2=(U→L2)i+((V→L2)i←W2)+B2 where L2=Li+1 or Li correspondingly, and $w(T.L2)=2^{W2}$.

Returning to FIG. 3 which shows a hardware implementation of these formulae for A1 and A2, the PLLC 50 in FIG. 3 has outputs supplying values W1, B1, W2 and B2 defining the widths and base locations for the maps to be addressed in TRAM1 and TRAM2, respectively. The PLLC 50 also generates a binary signal SWI1 which takes the value 1 or 0 depending on whether texture memory bank TRAM1 contains the map T.Li or T.Li+1, respectively, and a complementary signal SWI2=$\overline{SWI1}$ which gives the corresponding indication in relation to the other bank TRAM2 of the texture memory 41'.

In the remainder of the texture management circuit 49, an adder 51 is provided to generate the value Li+1 from the value Li generated by the DPU 28'. A multiplexer 52, responsive to the logic signal SWI1, selects either Li or Li+1 to generate the level coordinate L1 for the map stored in bank TRAM1. Another multiplexer 53 is responsive to the complementary logic signal SWI2 selects the other of Li and Li+1 to generate the level value L2 for the map stored in bank TRAM2. A first right-shifter 54, responsive to the level coordinate L1, receives the U coordinate of the pair U,V generated by the DPU 28' and generates a first scaled U coordinate U1=U→L1. A second right-shifter 55, responsive to the same level coordinate L1, requires the V coordinate and generates a first scaled V coordinate V1=V→L1. Third and fourth right-shifters 56 and 57 also receive the U and V coordinates, respectively, and are responsive to the level coordinate L2 to generate second scaled U and V coordinates U2=U→L2 and V2=V→L2, respectively, for the map stored in the second bank TRAM2 of the texture memory 41'.

The scaled coordinates U1, V1, U2 and V2 are all separated into their integer parts U1i, etc., and their fractional parts U1f etc. First and second left-shifters 58 and 59 receive the integer parts V1i and V2i of the scaled V coordinates V1 and V2, respectively, and are responsive to the width indices W1 and W2, respectively, so as to generate values $2^{W1}.V1i$ and $2^{W2}.V2i$, respectively, where $2^{W1}$ and $2^{W2}$ are the widths of the maps stored in the banks TRAM1 and TRAM2, respectively.

An adder 60 adds the integer part of U1i of the first scaled U coordinate U1 to the value $2^{W1}.V1i$ generated by the first left-shifter 58 to generate a first linear offset address I1. A further adder 61 adds the first offset address I1 to the first map base address B1 generated by the PLLC 50 to generate the first linear texel address A1 for application to the first bank TRAM1 of the texture memory 41'. Similarly, a further adder 62 generates a second linear offset address I2 by adding the values U2i and $2^{W2}.V2i$, while a still further adder 63 adds the second linear offset address I2 to the record map base address B2 generated by the PLLC 50 to generate the second linear texel address A2 for application to the second bank TRAM2 of the texture memory 41'. Since the bits of value V1i (or V2i), once shifted, do not overlap with those of the value U1i (U2i), the adders 60 and 62 can in fact be implemented by simpler OR-gates.

Each texture memory bank TRAM1 and TRAM2 is further divided, as shown, into four parts A, B, C, and D which can be addressed in parallel. The texel values defining a given map are distributed between the four parts A–D of the appropriate memory bank (TRAM1 or TRAM2) according to a predetermined pattern such as that illustrated by the letter A, B, C or D next to each texel value (solid circle) in FIG. 2, so as to allow parallel addressing of a 2×2 patch of texels. In the example pattern shown, in an even numbered line of texels (V even), texel values are stored alternately in parts A and B. In odd-numbered lines (V odd), the texel values are stored alternately in parts C and D.

To enable this patch addressing, a special address port 64 receives the linear texel address A1 from the output of adder 61 and generates therefrom four addresses A1A–A1D for application to the four memories TRAM1A to TRAM1D, respectively, in response to which the texel values for the patch (U,V), (U+1,V), (U,V+1) and (U+1,V+1) become available via four corresponding read ports 65A–65D.

To enable generation of the correct four addresses A1A–A1D, the address port 64 receives the least significant bits U1ilsb and V1ilsb of the integer parts of the first scaled coordinate pair U1,V1, which define whether U1 and V1, respectively, are odd or even. With regard to the detailed design of the patch addressing hardware 64, 65A–65D, this can be similar to that used for transforming digitized video images, an example of which is shown in FIG. 2 of an article "Transforming Digital Images in Real Time" by Joel H. Dedrick in ESD: The Electronic System Design Magazine, August 1987 at pages 81 to 85. One difference from the known hardware is necessitated by the linear storage of the texel arrays in the system shown in FIG. 3. In the Dedrick circuit, which uses a 2-D addressable framestore memory, a unit value 0001 is added to the vertical coordinate (Y') to address the texel values in the next row (Y'+1) of the image.

In the circuit of FIG. 3, however, the width $w(T.Li)=2^{W1}$ of the array must be added to the linear address A1 to address correctly the texel values for the next row Vi+1 of the linearly stored texture map. To this end, the address port 64 also receives the width index W1 generated by the PLLC 50 for the map stored in bank TRAM1.

A similar patch address port 66 is provided for the second bank TRAM2 of the texture memory 41' and receives the second linear address A2, odd/even indicators U2ilsb and V2ilsb and the second width index W2. The port 66 generates patch addresses A2A–A2D which are applied to respective parts A–D of the second texture memory bank TRAM2 which has four corresponding read ports 67A–67D.

It may be noted that many alternative arrangements may be suitable for generating the patch addresses A1A–A1D and A2A–A2D. For example, instead of generating the single linear address A1 and then expanding it to form addresses A1A–A1D, it may be advantageous to integrate the patch addressing function with the linear address generating function, to generate each of the addresses A1A–A1D directly from the coordinates L1, U1 and V1. While some components may need to be quadruplicated in such an embodiment, other components can contribute to the generation of at least two of the addresses A1A–A1D. It will also be appreciated that larger patches could be addressed with more parallel memories and suitable ports.

The four texel values from the read ports 65A–65D of bank TRAM1 are supplied to inputs of a first bilinear (2-D) interpolator BIL1 which also receives the fractional parts U1f and V1f of the first scaled coordinate pair U1,V1. The bilinear interpolator BIL1 combines the four texel values in the patch addressed by addresses A1A–A1D (derived from the integer parts U1i and V1i of the pair) so as to generate a first billnearly interpolated texel value MOD1. The texel values from the read ports 67A–67D of bank TRAM2 are similarly applied to a second bilinear interpolator BIL2 which also receives the fractional parts U2f and V2f of the second scaled coordinate pair U2,V2 and generates a second billnearly interpolated texel value MOD2.

The two bilinearly interpolated values MOD1 and MOD2, one derived from the map T.Li and the other derived from the map T.Li+1 are then fed to a linear interpolator LINT. The interpolator LINT combines the values MOD1 and MOD2 in proportions determined by the fractional part Lf of the level coordinate L received from the DPU 28 to generate a trilinearly interpolated modulation value MOD for the pyramidal coordinates L, U and V. As in the known apparatus (FIG. 1), the value MOD may be used to effect a modulation of pixel color values COL either directly (dotted path 42) or indirectly via further processing in the DPU 28'.

Where the texel values MOD define colors, it will be appreciated that each texel value will comprise three color component values such as R, G and B, and the interpolators BIL1, BIL2 and LINT may in fact comprise three interpolators each, or may be adapted in some other way to perform the three-component interpolation. The hardware shown in FIG. 3 also incorporates first and second feedback paths 70 and 72 so that the billnearly interpolated values MOD1 from the first memory bank TRAM1 can be fed into a write port 71 of the second bank TRAM2 of the texture memory 41' and the values MOD2 from the second bank TRAM2 can be fed into a write port 73 of the first bank TRAM1. The logic signal FB supplied by the DPU 28' indicates in the '1' state that a feedback path is to be activated. AND gates 74 and 75 combine the signal FB with the logic signals SWI1 and SWI2, respectively, generated by the PLLC 50 to generate a pair of logic signals FB1 and FB2, respectively. Two multiplexers 76 and 78 are responsive to the signals FB1=1 and FB2=1 respectively to complete either the first or second feedback path 70 or 72, respectively, when FB AND SWI1=1 or FB AND SWI2=1, respectively. At all other times, each multiplexer 76 or 78 serves to connect the corresponding write ports 71 or 73 with the CPU 14 via the bus 18. The purpose of the feedback paths 70 and 72 will be described in due course but for the moment it should be assumed that they are not active (FB=0).

FIG. 4 shows, by way of example, three part-pyramidal texture maps (T=1,2,3) stored in the linear memory banks TRAM1 and TRAM2 so as to allow parallel access to all the texel values required for trilinear interpolation. Each memory bank constitutes a linear physical address space A1 or A2 respectively. The 2-D array (map) of texel values for level Li of map T is stored in linear form as a page of data referenced PT.Li. Texture 1 can be seen to have four pages P1.0, P1.1, P1.2 and P1.3, each one quarter of the linear size of the previous page. While P1.0 is stored in bank TRAM1, page P1.1 is stored in bank TRAM2, P1.2 in bank TRAM1 and so on, alternating for as many levels as are stored.

The second texture (T=2) is stored as three pages P2.1 to P2.3, alternating between banks TRAM1 and TRAM2, each with a corresponding entry in the page table memory PTAB, described below with reference to FIG. 5. A highest level page P2.0 exists, but, because it is not required at the time illustrated, it is not stored in the texture memory, so that more free space (shaded) is available to receive other maps as required. In fact, the memory map shown in FIG. 4 may represent a time when many different maps, forming various levels of various texture pyramids, have been loaded, used and then deleted as the corresponding texture has become not required, or not required at such a high (or low) resolution. It should be noted that even if more texel data is required than there is room for in the banks TRAM1 and TRAM2 of the texture memory 41', at least a low resolution map can be loaded and interpolated to the size required until the space does become available. This "graceful degradation" characteristic of the linear texture memory contrasts favorably with the known 2-D MIP map memory in which a texture pyramid generally occupies space at all levels or not at all.

The third texture (T=3) is also only loaded in three pages, again alternately between TRAM1 and TRAM2, but page P3.0 is smaller than the Li=0 pages of the first two textures, simply because there is less detail required to define the third texture. This again allows more efficient usage of texture memory capacity compared with the conventional MIP map.

FIG. 5 shows the contents of the page table memory PTAB, shown dotted within the page location and logic circuit PLLC 50 of FIG. 3, which enables a given array T.Li to be found in the memory. There is an entry in the page table for each page PT.Li of each texture. A first item in each entry is a single bit value SWI1/$\overline{SWI2}$ which takes the value 1 or 0 depending on whether the page is stored in the bank TRAM1 or the bank TRAM2, respectively. This bit value therefore enables the logic circuit PLLC to generate the signals SWI1 and SWI2 to control the generation of the addresses A1 and A2 as described with reference to FIG. 3.

A second item in each entry in the table is the width index W of the map T.Li. The page P1.0 contains a map $2^W=2^9=512$ texels wide, P1.1 a map $2^8=256$ texels wide, P3.1 a map $2^7=128$ texels wide and so on. A third item in each entry contains the base location B in the memory (TRAM1 or TRAM2) starting at which the texel values comprising that page are stored.

Returning to FIG. 3, the arrays of texel values forming the pages Pi.0 etc. can be stored in the memory banks TRAM1 and TRAM2 by the CPU 14 via the bus 18 and write ports 71 and 73, respectively, as shown. It is a straightforward matter of "housekeeping" for the CPU 14 to ensure that (i) any new page of texel data is stored in an otherwise unused part of the texture memories, (ii) each alternate level of a given pyramid is stored in a different bank TRAM1 or TRAM2 and (iii) that the page table PTAB in the PLLC 50 is at the same time loaded with the appropriate values of SWI1/$\overline{SWI2}$, W and B. If enough space is not available in a single block for a new texture (perhaps P2.0 is to be loaded), then a "garbage collection" operation can be carried out to gather the unused areas together into a large enough area.

Entire pyramidal texture arrays may be stored in a database in the disc store 20 or in the main memory 24, with the various 2-D level arrays (maps) being transferred to spare locations in the appropriate texture memory as required. However, the provision of the feedback paths 70 and 72 enables the bilinear interpolators BIL1 or BIL2 to be used as filters in a manner to be described below to generate maps for successive levels from a single, high resolution map loaded via the bus 18. This may be advantageous, since the hardware with patch-addressing and interpolation may provide a much faster filter than the conventional alternative which is a software routine executed by the CPU 14.

FIG. 6 shows a flowchart defining a sequence of operations performed to generate a filtered map T.Li+1 from a map T.Li previously stored in one bank of the texture memory 41', using the feedback of values generated by the existing bilinear interpolators. In a first step 80, the CPU 14 allocates texture memory space for the page PT.Li+1 by loading an entry comprising appropriate values SWI1/$\overline{SWI2}$ (T.Li+1), W(T.Li+1) and B(T.Li+1) in the page table PTAB within the PLLC 50.

Next, in a step 82, the DPU 28' is caused to set the logic signal FB=1 to enable activation of the appropriate feedback path 70 or 72. In step 84, the DPU 28' arranges that any values MOD generated by the linear interpolator LINT during the filtering process are ignored. In a step 86, the DPU 28 is set up as it would be for drawing a polygon, with values for $U_0$, $V_0$ and the partial derivatives chosen so as to cause the generation of the desired filtered values. Referring to FIG. 2, suitable texel positions for the filtered map T.Li+1 are marked by circled crosses ("+"). To cause the generation of values interpolated to these texel positions, the starting position would be $(U_0,V_0)=(\frac{1}{2}, \frac{1}{2})$, with partial derivatives as follows: $\partial U/\partial X=2$; $\partial V/\partial X=0$; $\partial U/\partial Y=0$; $\partial V/\partial Y=2$.

In step 88, the DPU 28' is caused to "draw" the imaginary polygon, leading to the automatic generation of the desired filtered values MOD1 or MOD2 at the output of the bilinear interpolator BIL1 or BIL2, depending on whether the source map T.Li is stored in bank TRAM1 or TRAM2. At the same time, because logic signal FB=1 and either SWI1=1 or SWI2=1, either FB1=1 or FB2=1, and consequently one of the multiplexers 76 and 78 is activated to complete the appropriate feedback path 70 or 72. The interpolated values are then automatically written into the locations in the other memory bank (TRAM2 or TRAM1) that were allocated for the map T.Li+1 in step 80.

The process of FIG. 6 can be repeated if required, incrementing the level coordinate L each time as shown dotted in step 90, to use the feedback paths 70 and 72 alternately, until an entire pyramidal array may have been generated within the display processor from a single externally generated high-resolution array. Those skilled in the art will appreciate that different scaling factors are possible, and asymmetrical filtering would be possible in embodiments where asymmetrical maps are allowed for, for example to generate a rectangular map from a square one. As a particular example, using $(U_0V_0=(0,0)$ with $\partial U/\partial X=1$; $\partial V/\partial X=0$; $\partial U/\partial Y=0$ and $\partial V/\partial Y=1$ would provide a texel-for-texel transfer of a map from one bank of the texture memory to the other. Such a transfer may be useful in the "garbage collection" operations mentioned above.

The use of the texture mapping hardware itself for map filtering and/or transfer has advantages over the conventional method using software running on the host computer, because the display processor hardware is already specialized for rapid addressing of texture arrays, including 2×2 patch addressing hardware, interpolating hardware geared to receive R, G and B in parallel, and so forth. This advantage can be readily appreciated by considering that filtering or transferring a 2-D array in this apparatus takes about the same amount of time as it would take to render a single, similarly sized polygon. This is an overhead that can generally be absorbed in real-time without a significant loss in performance since a typical system may already be rendering hundreds or even thousands of polygons in each image frame. The use of feedback to implement a hardware texture filter is not dependent on the linear nature of the map storage, nor on the dual-bank memory construction. Even in a conventional 2-D MIP map arrangement such FIG. 1, and even if parallel access to the two patches of texels were not provided, the use of the specialized addressing and interpolating hardware to generate filtered maps still offers a great speed advantage over the conventional software approach, and the overhead is still only equivalent to one polygon.

The limitations on map sizes and so forth imposed in the embodiment described simplify the construction, for example, of the PLLC 50 and allow the use of bit shifters 54 to 59 instead of complex multipliers. These limitations also simplify the allocation of space to new pages in the texture memory. Clearly, however, the design need not be limited to this case, and some variations will be enumerated below. For example, the width index W would not need to be stored separately if it were known that a map's width was always $2^{N-Li}$, where $2^N$ is the size of the largest permitted map. Thus, in the example of FIGS. 4 and 5 where the highest level of the texture T=3 is only 256 texels wide, the width index could be eliminated if the page P3.0 were renamed P3.1, and so on, since it could then be known that all maps with Li=1 have W=8 (width=256), whether or not there exists a larger map with Li=0. To cater for asymmetrically filtered maps, two level values Lu and Lv could be supplied, identifying a previously stored map of $2^{N-Lui}$ texels by $2^{N-Lvi}$ rows. Other variations that may be allowed, will be readily apparent to those skilled in the art who will also readily appreciate the variations in the structure of the texture management circuit that would be required to implement such variations.

Figure 7A:
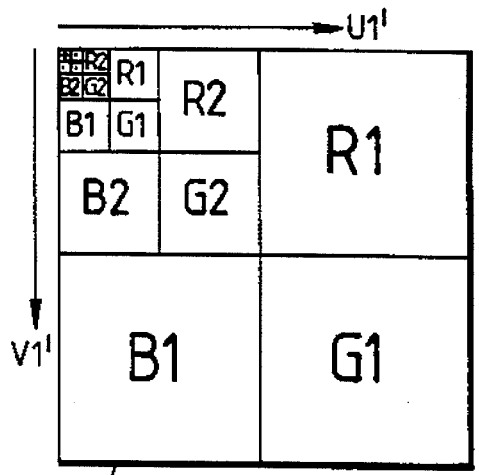
FIGS. 7A and 7B illustrate the storage of two pyramidal texture maps in two two-dimensional texture memories similar to that of the known hardware.
Figure 7B:
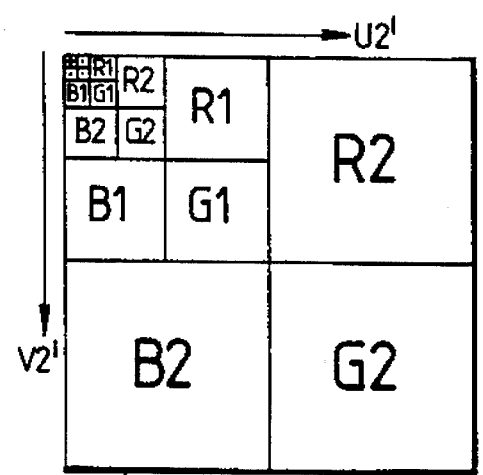

Those skilled in the art will further appreciate that the principle of providing a dual-bank texture memory to allow parallel access for inter-level interpolation is not only applicable to the linear texture memory arrangements described above. FIGS. 7A and 7B illustrate one possible way of storing two pyramidal texture arrays (R1/G1/B1 and R2/G2/B2) in two two-dimensional texture memory banks 170 and 172. The allocation is similar to the conventional MIP map arrangement of FIG. 2 but allows parallel read-out from adjacent levels of any one texture. Those skilled in the art will readily appreciate how the mapping hardware 40 of FIG. 1 can be adapted to incorporate and take advantage of a dual texture memory in accordance with this scheme, to achieve parallel addressing of the two level maps required for inter-level interpolation. The provision of feedback paths analogous to the paths 70 and 72 (FIG. 3) would also allow the hardware to generate pyramids from single high-resolution maps.

From reading the present disclosure, yet other variations will be apparent to persons skilled in the art. Such variations may involve other features which are already known in the design, manufacture and use of electronic graphics systems, texture mapping hardware and component parts thereof and which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly or any generalization thereof, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

I claim:

1. A display apparatus including a display processor having an associated texture memory for storing a pyramidal array of texture element ("texel") values comprising a plurality of two-dimensional (2-D) arrays representing a 2-D modulation pattern at at least two distinct levels of resolution, the display processor further having means for storing said 2-D arrays in said texture memory, means for receiving a primitive description, said primitive description including an indication that the stored modulation pattern is to be mapped onto a primitive for display, means for generating 2-D coordinate pairs addressing texel values in a stored 2-D array to effect the mapping of the stored modulation pattern onto the primitive, and 2-D interpolation means responsive to fractional parts of the 2-D coordinate pairs for combining together a number of texel values from the addressed array so as to generate an interpolated texel value, wherein the apparatus further comprises feedback means coupling an output of said 2-D interpolation means to said 2-D array storing means, whereby interpolated texel values generated by the 2-D interpolating means from one 2-D array are selectively stored back in the texture memory to form a further 2-D array of the pyramidal array thereby effecting a filtering operation on said one 2-D array enabling the generation of 2-D arrays for successive levels from a single, high resolution 2-D array.

2. A display apparatus as claimed in claim 1, wherein the texture memory is divided into at least three parallel-addressed memories, and wherein the 2-D array storing means are arranged to distribute, in said at least three parallel-addressed memories, the texel values of each 2-D array in an interleaved manner so that values for a 2-D patch of texels are readable in parallel from the texture memory for supply to the 2-D interpolating means in response to a single 2-D coordinate pair.

3. A display apparatus as claimed in claim 2, wherein the texture memory comprises a linearly-addressed memory, the display processor further comprising physical address generating means for receiving a 2-D coordinate pair and for generating therefrom a linear physical address for application to the texture memory.

4. A display apparatus as claimed in claim 1, wherein the texture memory comprises separate first and second parallel-addressable texture memory banks, and in that the feedback means and the 2-D array storing means are arranged to store the further 2-D array in a different one of said texture memory banks to that in which the one 2-D array is stored, thereby enabling the read-out of texel values from the one 2-D array for supply to the interpolating means to be performed in parallel with the storage of interpolated values to form the further 2-D array.

5. A display apparatus as claimed in claim 4, wherein each of the first and second texture memory banks is further divided into at least three parallel-addressable memories, and wherein the 2-D array storing means are arranged to distribute the texel values of each 2-D array in an interleaved manner so that values for a 2-D patch of texels are readable in parallel from each of the first and second texture memory banks, the interpolating means being arranged to combine 2-D interpolation within each patch with inter-level interpolation to generate a single 3-D interpolated value from two patches comprising eight or more stored texel values.

6. A display apparatus as claimed in claim 5, wherein the 2-D interpolating means include first and second 2-D interpolators, for performing 2-D interpolation between the values within 2-D patches stored in the first and second texture memory banks, respectively, and wherein the feedback means and said 2-D array storing means selectively write texel values read from a d-D array stored in one of said first and second texture memory banks and interpolated by the first 2-D interpolator into a further 2-D array in the other of said first and second texture memory banks.

7. A display apparatus as claimed in claim 6, wherein the texture memory comprises a linearly-addressed memory, the display processor further comprising physical address generating means for receiving a 2-D coordinate pair and for generating therefrom a linear physical address for application to the texture memory.

8. A display apparatus as claimed in claim 4, wherein the 2-D coordinate generating means, the feedback means, and the 2-D array storing means are arranged to generate and store successively lower-resolution levels of 2-D arrays for the pyramidal array, alternately in the first and second texture memory banks.

9. A display apparatus as claimed in claim 8, wherein each of the first and second texture memory banks is further divided into at least three parallel-addressable memories, and wherein the 2-D array storing means are arranged to distribute the texel values of each 2-D array in an interleaved manner so that values for a 2-D patch of texels are readable in parallel from each of the first and second texture memory banks, the interpolating means being arranged to combine 2-D interpolation within each patch with inter-level interpolation to generate a single 3-D interpolated value from two patches comprising eight or more stored texel values.

10. A display apparatus as claimed in claim 9, wherein the 2-D interpolating means include first and second 2-D interpolators, for performing 2-D interpolation between the values within 2-D patches stored in the first and second texture memory banks, respectively, and wherein the feedback means and said 2-D array storing means selectively write texel values read from a 2-D array stored in one of said first and second texture memory banks and interpolated by the first 2-D interpolator into a further 2-D array in the other of said first and second texture memory banks.

11. A display apparatus as claimed in claim 1 wherein the texture memory comprises a linearly-addressed memory, the display processor further comprising physical address generating means for receiving a 2-D coordinate pair and for generating therefrom a linear physical address for application to the texture memory.

12. A method of operating a display apparatus constructed in accordance with claim 11, the method comprising the steps of:
(a) transferring from a main memory to the texture memory a first 2-D array of texture values representing a 2-D modulation pattern at a first level of resolution using said 2-D array storing means;
(b) causing the 2-D coordinate pair generating means within the display processor to generate 2-D coordinate pairs addressing systematically the texel values in a first 2-D array so that the interpolated values generated by the 2-D interpolating means are fewer in number than those in the first 2-D array and represent the modulation pattern at a second level of resolution lower than the first level; and
(c) activating the feedback means and the 2-D array storing means so as to store the interpolated values in the texture memory in the form of a second, smaller, 2-D array of texel values, which thereby forms, with the first 2-D array, part of a pyramidal array.

13. A method as claimed in claim 12, wherein the second 2-D array when stored contains half as many texel values as the first array in at least one dimensions.

14. A method as claimed in claim 13, wherein the steps (b) and (c) are repeated substituting the second 2-D array for the first 2-D array and so as to generate further 2-D arrays each smaller than the last and each representing the modulation pattern at a lower level of resolution than the last.

15. A method as claimed in claim 12, wherein the steps (b) and (c) are repeated substituting the second 2-D array for the first 2-D array so as to generate further 2-D arrays each smaller than the last and each representing the modulation pattern at a lower level of resolution than the last.

16. A method of operating a display apparatus constructed in accordance with claim 1, the method comprising the steps of:
(a) transferring from a main memory to the texture memory a first 2-D array of texture values representing a 2-D modulation pattern at a first level of resolution using said 2-D array storing means;
(b) causing the 2-D coordinate pair generating means within the display processor to generate 2-D coordinate pairs addressing systematically the texel values in a first 2-D array so that the interpolated values generated by the 2-D interpolating means are fewer in number than those in the first 2-D array and represent the modulation pattern at a second level of resolution lower than the first level; and
(c) activating the feedback means and the 2-D array storing means so as to store the interpolated values in the texture memory in the form of a second, smaller, 2-D array of texel values, which thereby forms, with the first 2-D array, part of a pyramidal array.

17. A method as claimed in claim 16 wherein the second 2-D array when stored contains half as many texel values as the first array in at least one dimensions.

18. A method as claimed in claim 17, wherein the steps (b) and (c) are repeated substituting the second 2-D array for the first 2-D array so as to generate further 2-D arrays each smaller than the last and each representing the modulation pattern at a lower level of resolution than the last.

19. A method as claimed in claim 16 wherein the steps (b) and (c) are repeated substituting the second 2-D array for the first 2-D array at least one so as to generate further 2-D arrays each smaller than the last and each representing the modulation pattern at a lower level of resolution than the last.

* * * * *